(12) United States Patent
Lugg (10) Patent No.: US 7,421,107 B2
(45) Date of Patent: *Sep. 2, 2008

(54) METHOD OF CREATING A SUBSTITUTE CHECK AND AN APPARATUS THEREFOR

(75) Inventor: Richard P. Lugg, Waterloo (CA)

(73) Assignee: NCR Corporation, Dayton, OH (US)

( * ) Notice: Subject to any disclaimer, the term of this patent is extended or adjusted under 35 U.S.C. 154(b) by 696 days.

This patent is subject to a terminal disclaimer.

(21) Appl. No.: 10/871,408

(22) Filed: Jun. 18, 2004

(65) Prior Publication Data

US 2005/0281448 A1 Dec. 22, 2005

(51) Int. Cl.
*G06K 9/00* (2006.01)

(52) U.S. Cl. .......................... 382/139; 382/292; 902/27

(58) Field of Classification Search ................. 382/101, 382/102, 112–117, 135–139, 140, 168, 181, 382/185, 186–189, 232, 274, 276, 282–299, 382/321, 202, 231, 305; 235/380; 705/50; 707/200; 400/578; 902/27

See application file for complete search history.

(56) References Cited

U.S. PATENT DOCUMENTS

| | | | | |
|---|---|---|---|---|
| 5,550,932 A | * | 8/1996 | Blaylock et al. | 382/139 |
| 6,023,705 A | * | 2/2000 | Bellinger et al. | 707/200 |
| 6,351,553 B1 | * | 2/2002 | Hayosh | 382/139 |
| 6,860,423 B2 | * | 3/2005 | Kallin | 235/380 |
| 7,066,668 B2 | * | 6/2006 | Sandison et al. | 400/578 |
| 7,113,925 B2 | * | 9/2006 | Waserstein et al. | 705/50 |

\* cited by examiner

*Primary Examiner*—Seyed Azarian
(74) *Attorney, Agent, or Firm*—Michael Chan (57) ABSTRACT

A substitute check is created for an original check which has an encode line printed thereon. Check image data which is representative of an image of the original check is received and analyzed to establish positioning of MICR characters within the encode line of the original check. An encode line of the substitute check is formatted based upon the positioning of MICR characters within the encode line of the original check such that the formatted encode line of the substitute check matches the encode line of the original check. The formatted encode line of the substitute check is printed to create at least a portion of the substitute check.

11 Claims, 7 Drawing Sheets

JAMES C. MORRISON
MARY B. MORRISON
1765 SHERIDAN DRIVE
YOUR CITY, STATE 04001

145

Jan 1, 2002
DATE

PAY TO the order of NORTH POLE, INC. $ 295.45

Two Hundred Ninety Five and 45/100 DOLLARS

Your Bank
YOUR CITY, STATE 12345

MEMO Goodies

James C. Morrison

⑆000067894⑆ 12345678⑈ 0145

*011500120*
01/04/2002
8587408979

[0530001831] 01/03/2002
1800539446

This is a LEGAL COPY of your check. You can use it the same way you would use the original check.

METHOD OF CREATING A SUBSTITUTE CHECK AND AN APPARATUS THEREFOR

BACKGROUND OF THE INVENTION

The present invention relates to substitute checks, and is particularly directed to a method of creating a substitute check for use in a check truncation environment and an apparatus therefor.

In a check truncation environment, an original check is not transferred between banks during the check clearing process. Instead, electronic image data which is representative of an image of the original check is transferred between the banks. When a paper version of the original check is needed, it may be created on demand using the electronic image and related data which is representative of the original check. The paper version of the original check is called a substitute check, and is sometimes referred to as an image replacement document (IRD).

An image of the front side of the original check and an image of the back side of the original check must be printed when a substitute check is created. A magnetic ink character recognition (MICR) line of the original check must also be printed. The MICR line of the substitute check needs to contain all information from the MICR line of the original check, and needs to be printed with magnetic ink. The substitute check needs to be suitable for automated processing in the same manner as the original check.

In certain known check processing applications, the MICR line of the substitute check is unable to be exactly re-created from the MICR line of the original check. The MICR line of the substitute check is unable to be exactly re-created because spaces between different MICR fields in the MICR line of the original check are not included in a print data file which is used by a substitute check printer to print the MICR line of the substitute check when the substitute check is created. Spaces between the different MICR fields in the MICR line of the original check are not included in the print data file because a MICR reader in each of these known check processing applications is unable to "see" spaces between the different MICR fields in the MICR line of the original check when the MICR reader reads the MICR line of the original check. Accordingly, any subsequent attempt to re-create the MICR line of the original check based upon this print file data would not include spaces between the different MICR fields. It would be desirable to ensure that the MICR line (including any spaces between the different MICR fields in the MICR line) of the original check be faithfully re-created for a substitute check when the substitute check is created.

SUMMARY OF THE INVENTION

In accordance with one aspect of the present invention, a method of creating a substitute check comprises receiving check image data which is representative of an image of an original check, receiving original magnetic ink character recognition (MICR) line data which is representative of MICR characters contained in a MICR line of the original check, decoding the check image data to provide decoded MICR line data, comparing the decoded MICR line data with the original MICR line data, creating modified MICR line data which is different from the original MICR line data based upon the comparison of the decoded MICR line data with the original MICR line data, sending the modified MICR line data to a substitute check printer, and printing a MICR line of a substitute check based upon the modified MICR line data. The decoding the check image data may include optically reading the MICR characters which are defined by the check image data. The comparing the decoded MICR line data with the original MICR line data may include determining if characters represented by the decoded MICR line data and characters represented by original MICR line data match.

In accordance with another aspect of the present invention, a method of processing check image data which is representative of an image of an original check and original magnetic ink character recognition (MICR) line data which is representative of MICR characters contained in an original MICR line of the original check to provide data for use in re-creating a substitute check comprises decoding the check image data to provide decoded MICR line data which is representative of MICR character and spaces contained in the MICR line of the image of the check, and matching the decoded MICR line data and the original MICR line data to provide modified MICR line data which is representative of an encode MICR line for use in creating the substitute check. The modified MICR line data includes data which is representative of spaces between characters. The decoding the check image data may include optically reading characters which are defined by the check image data.

In accordance with yet another aspect of the present invention, a method of creating a substitute check for an original check which has an encode line printed thereon comprises receiving check image data which is representative of an image of the original check, analyzing the check image data to establish positioning of MICR characters within the encode line of the original check, formatting an encode line of the substitute check based upon the positioning of MICR characters within the encode line of the original check such that the formatted encode line of the substitute check matches the encode line of the original check, and printing the formatted encode line of the substitute check to create at least a portion of the substitute check.

In accordance with still another aspect of the present invention, an apparatus is provided for processing check image data which is representative of an image of an original check and original magnetic ink character recognition (MICR) line data which is representative of MICR characters contained in an original MICR line of the original check to provide data for use in re-creating a substitute check. The apparatus comprises means for decoding the check image data to provide decoded MICR line data which is representative of MICR character and spaces contained in the MICR line of the image of the check, and means for matching the decoded MICR line data and the original MICR line data to provide modified MICR line data which is representative of an encode MICR line for use in creating the substitute check. The modified MICR line data includes data which is representative of spaces between characters. The means for decoding the check image data may include means for optically reading characters which are defined by the check image data.

In accordance with still another aspect of the present invention, an apparatus is provided for creating a substitute check for an original check which has an encode line printed thereon. The apparatus comprises means for receiving check image data which is representative of an image of the original check, means for analyzing the check image data to establish positioning of MICR characters within the encode line of the original check, means for formatting an encode line of the substitute check based upon the positioning of MICR characters within the encode line of the original check such that the formatted encode line of the substitute check matches the encode line of the original check, and printing the formatted encode line of the substitute check to create at least a portion of the substitute check.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to a method of creating a substitute check and an apparatus therefor. The specific environment in which the substitute check is used may vary. In the present application, the substitute check is used in a check truncation environment. The substitute check is sometimes referred to as an image replacement document (IRD). The American National Standards Institute (ANSI) X9.90 standard defines the content of IRDs in a check truncation environment. This standard defines the content of an IRD using front and back images of an original check and related data associated with the check.

Figure 1:
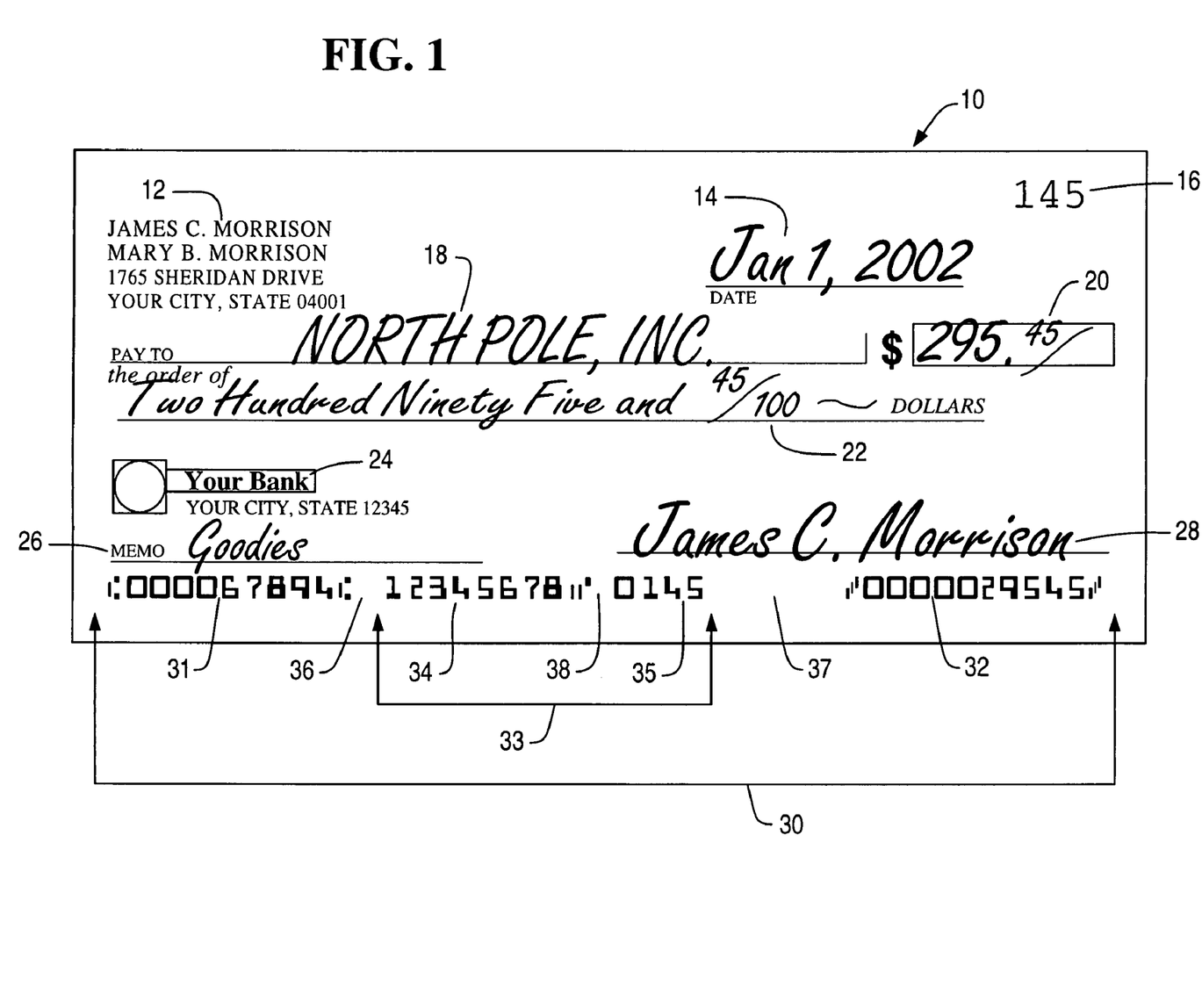
FIG. 1 is an illustration of a front side of an original check having a magnetic ink character recognition (MICR) line.

Different types of checks are processed in a check truncation environment. A personal check 10, such as shown in FIG. 1, is one type of check which is processed in a check truncation environment. The features of the check 10 shown in FIG. 1 include a payer field 12, a date field 14, a check number field 16 located in the upper-right corner of the check, a payee field 18, a courtesy amount field 20, a legal amount field 22, a paying bank name field 24, a memo field 26, a payer signature field 28, and a magnetic ink character recognition (MICR) codeline field 30 which comprises a MICR line.

The MICR line 30 includes a number of different MICR fields. As shown in FIG. 1, these different MICR fields include (i) a routing and transit number field 31, (ii) an amount field 32, and (iii) an ON-US field 33 which includes an account number sub-field 34 and a check number sub-field 35. A number of spaces 36 is disposed between the routing and transit number field 31 and the ON-US field 33, a number of spaces 37 is disposed between the ON-US field 33 and the amount field 32, and a number of spaces 38 is disposed between the account number sub-field 34 and the check number sub-field 35.

Figure 2:
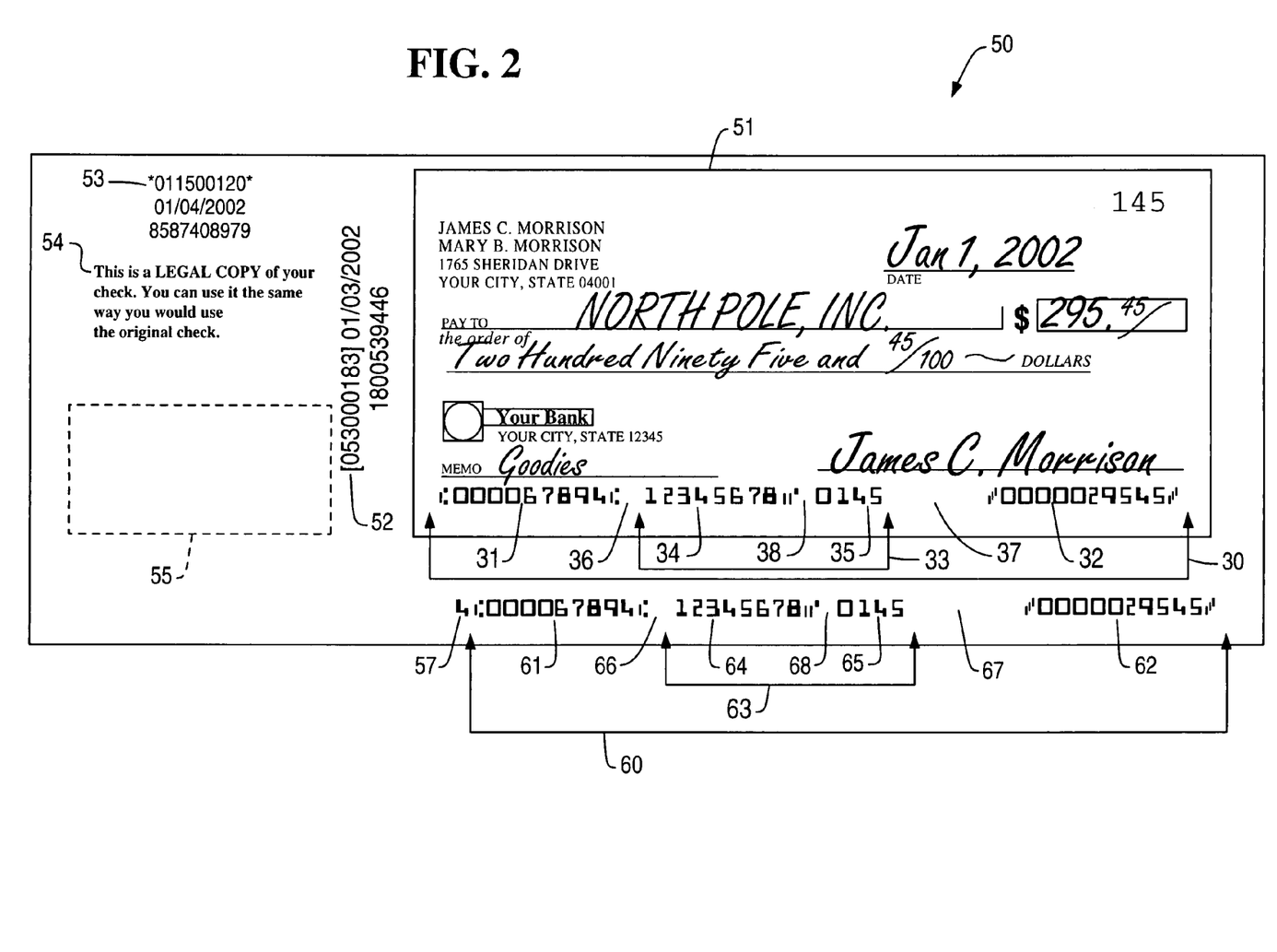
FIG. 2 is an illustration of a front side of a substitute check for the original check of FIG. 1, and showing a MICR line which appears the same as the MICR line of the original check.
Figure 3:
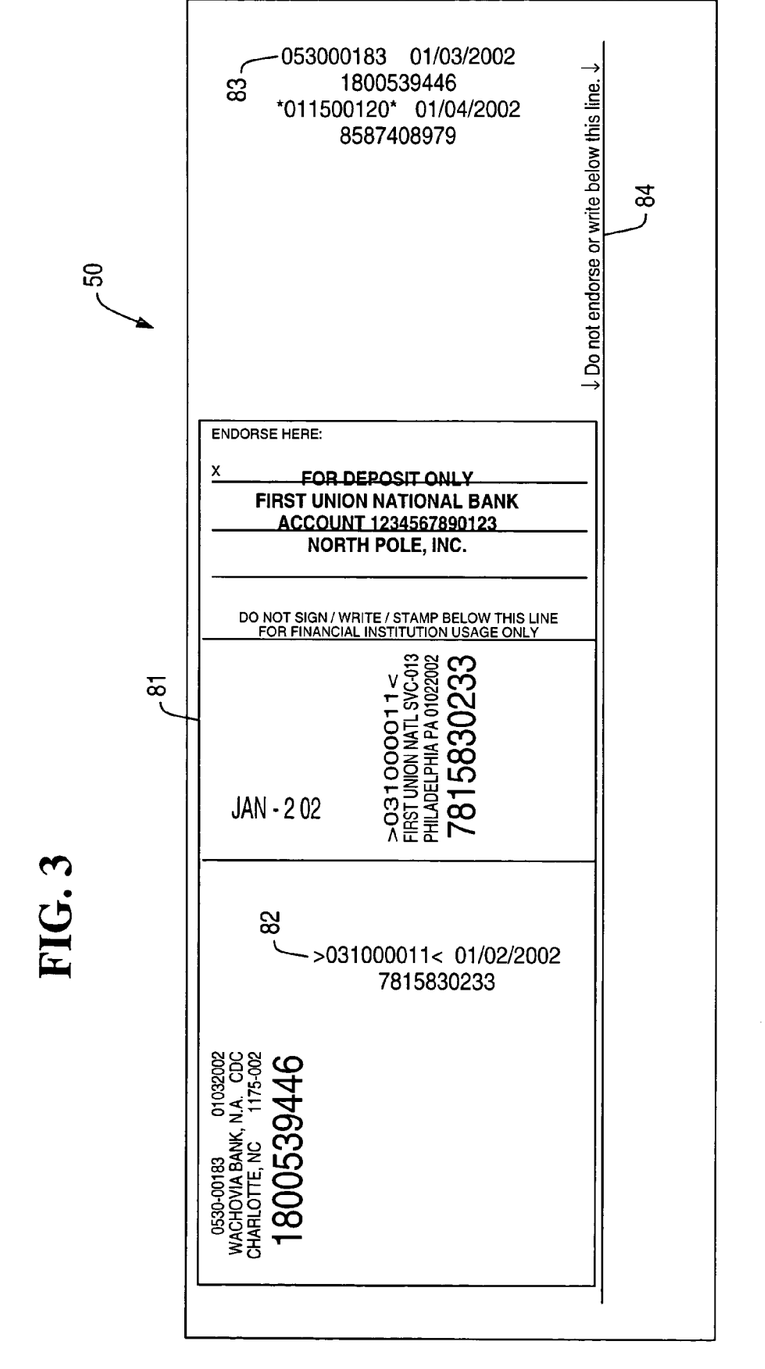
FIG. 3 is an illustration of a back side of the substitute check of FIG. 2.

Referring to FIGS. 2 and 3, a front side (FIG. 2) of an original IRD 50 for the check 10 of FIG. 1 and a back side (FIG. 3) of the original IRD are illustrated. The front side of the original IRD 50 includes an original scanned front image 51 of the check 10. The front side of the original IRD 50 also includes an endorsement 52 of the bank which captured the image of the check 10 to provide the front image 51. The bank which captured the front image 51 of the check 10 may or may not be the bank of first deposit (BOFD).

The front side of the original IRD 50 further includes an endorsement 53 of the bank which created the original IRD. This endorsement 53 includes three elements which are (i) the routing transit number "011500120" associated with the original IRD 50, (ii) the date of creation of the original IRD (i.e., "Jan. 4, 2002"), and (iii) the sequence number "8587408979" associated with the original IRD. The two asterisks enclosing the routing transit number are used to indicate that this is the bank which created the original IRD 50, as defined by the ANSI X9.90 standard. The front side of the original IRD 50 also includes a text overlay 54 which identifies the original IRD as being a legal copy of the check 10. Also included is an optional information area 55, as defined by the ANSI X9.90 standard, for placing optional information.

The front side of the original IRD 50 also includes a MICR line 60 which has been encoded. The encoded MICR line 60 is printed with ink which contains magnetic properties (sometimes referred to as "magnetic ink") and appears the same as the MICR line 30 of the check 10 shown in FIG. 1. An IRD identification 57 is adjacent to the encoded MICR line 60, in the position as shown in FIG. 2. The IRD identification 57 is referred to as an "electronic processing code (EPC) digit" as defined by the ANSI X9.90 standard. The IRD identification 57 is also printed with magnetic ink.

As shown in FIG. 3, the back side of the original IRD 50 includes an original scanned back image 81 of the check 10. The back side of the original IRD 50 also includes an initial BOFD endorsement overlay 82. An overlay 83 of any subsequent endorsements, and a line/text overlay 84 which requests that no writings be made below the line are also included.

Figure 4:
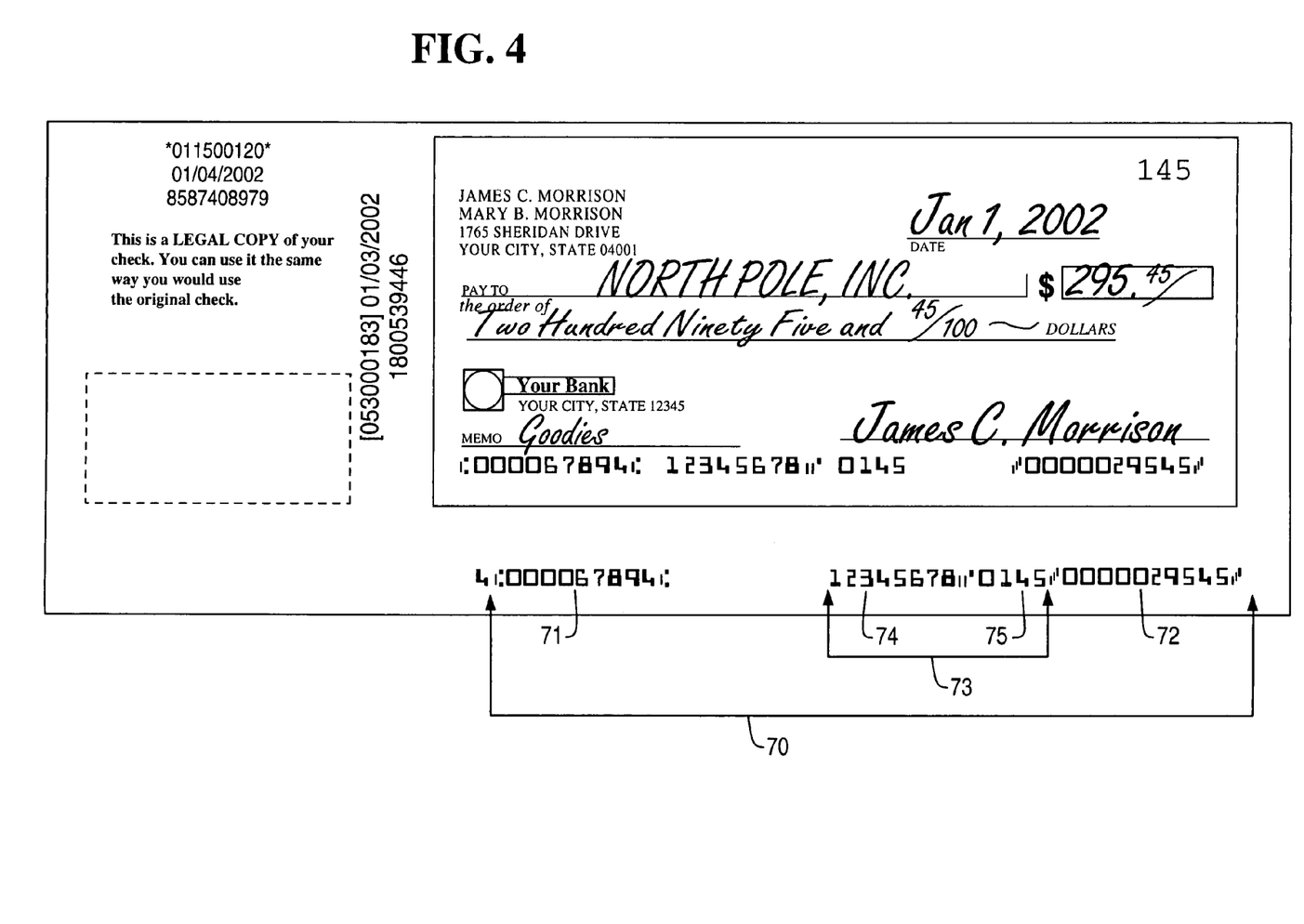
FIG. 4 is an illustration similar to the illustration of FIG. 2, but showing a MICR line which does not appear the same as the MICR line of the original check.

It should be noted that the encoded MICR line 60 shown in FIG. 2 appears exactly as the MICR line 30 of the check 10 shown in FIG. 1. The appearance is exact from the vantage point that the spacing 66 between MICR field 61 and MICR field 63, the spacing 67 between MICR field 63 and MICR field 62, and the spacing 68 between sub-field 64 and sub-field 65 in the encoded MICR line 60 appears the same as the spacing 36, the spacing 37, and the spacing 38, respectively, in the MICR line 30 of the check 10. However, as mentioned in the "Background of the Invention" hereinabove, there are certain known check processing applications in which an encoded MICR line of an IRD is unable to be exactly re-created so as to appear the same as a MICR line of its corresponding original check. An example of an encoded MICR line which does not exactly appear as the MICR line 30 of the original check 10 of FIG. 1 is shown in FIG. 4, and is designated with reference numeral "70". It should be apparent that there are additional spaces between MICR field 71 and MICR field 73, no spaces between MICR field 73 and MICR field 72, and no spaces between sub-field 74 and sub-field 75 in the encoded MICR line 70 shown in FIG. 4.

In accordance with the present invention, a method and apparatus are provided to avoid the above-described problem in the certain known check processing applications. The method and apparatus of the present invention ensure that the encoded MICR line of the IRD is re-created to appear exactly as the MICR line of the original check. The encoded MICR line of the IRD includes all characters in the MICR line of the original check as well as all spaces between the different MICR fields and/or sub-fields in the MICR line of the original check.

Figure 5:
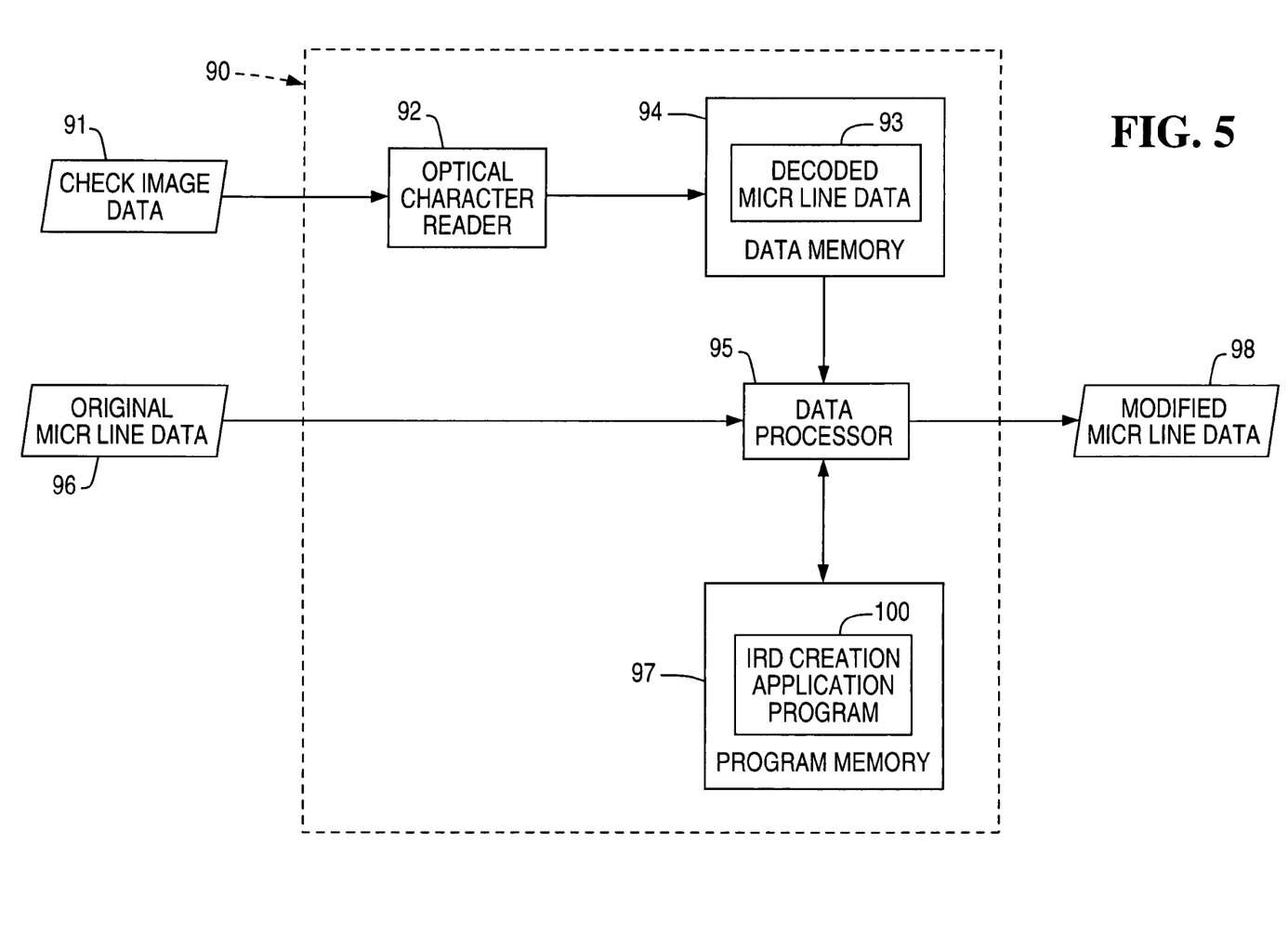
FIG. 5 is a schematic block representation of an apparatus constructed in accordance with the present invention.

Referring to FIG. 5, a schematic block representation of an apparatus 90 constructed in accordance with the present invention is illustrated. The apparatus 90 includes an optical character recognition (OCR) reader 92 for optically reading a MICR line from check image data 91 which is representative of different check image views of the check 10 shown in FIG. 1. It is contemplated that the OCR reader 92 may be any type of reader including a software-type of OCR reader or a hardware-type of OCR reader. When the OCR reader 92 reads the MICR line from the check image data 91, the OCR reader provides decoded MICR line data 93 which is stored in a data memory 94.

The decoded MICR line data 93 stored in the data memory 94 is representative of characters contained in the MICR line 30 appearing in the front image 51 (FIG. 2) of the check 10 of FIG. 1. For simplicity, the reference numerals used to designate the different MICR fields and the spaces between the MICR fields shown in the front image 51 of FIG. 2 are the same as the reference numerals used and shown in the original check 10 of FIG. 1. More specifically, the decoded MICR line data 93 includes MICR field data which is representative of characters contained in the R/T number field 31, MICR field data which is representative of characters contained in the ON-US field 33, and MICR field data which is representative of characters contained in the amount field 32. The decoded MICR line data 93 also includes data which is representative of any space(s) between adjacent MICR line fields and/or adjacent MICR line sub-fields of the MICR line. As shown in FIG. 2, this would include the spaces 36 between the R/T number field 31 and the ON-US field 33, the spaces 37 between the ON-US field 33 and the amount field 32, and the spaces 38 between the account number sub-field 34 and the check number sub-field 35.

The apparatus 90 further includes a data processor 95 for retrieving and processing the decoded MICR line data 93 which has been stored in the data memory 94. The data processor 95 also receives and processes original MICR line data 96 which is representative of the MICR line of the original check 10. The original MICR line data 96 is provided by a MICR reader (not shown) associated with the particular check processing application. For purposes of describing the present invention, the original MICR line data 96 provided by the MICR reader of this particular check processing application does not include any data which represents spaces between different MICR fields in the MICR line of the original check 10. The data processor 95 executes an IRD creation application program 100 which is stored in a program memory 97 to provide modified MICR line data 98. The modified MICR line data 98 is provided based upon processing of the decoded MICR line data 93 and the original MICR line data 96.

Figure 6A:
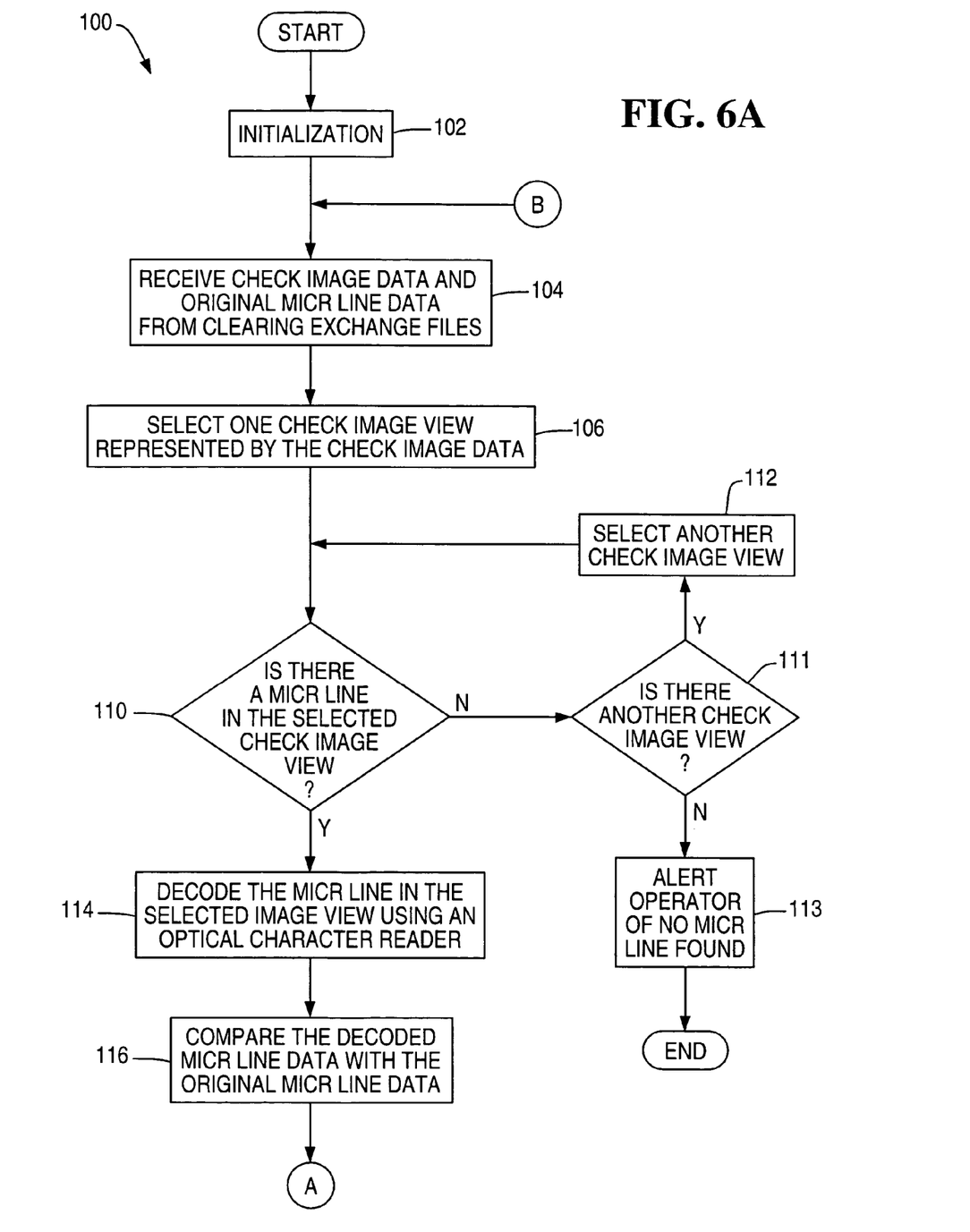
FIGS. 6A and 6B is a flowchart depicting a program for creating a substitute check in accordance with the present invention.
Figure 6B:
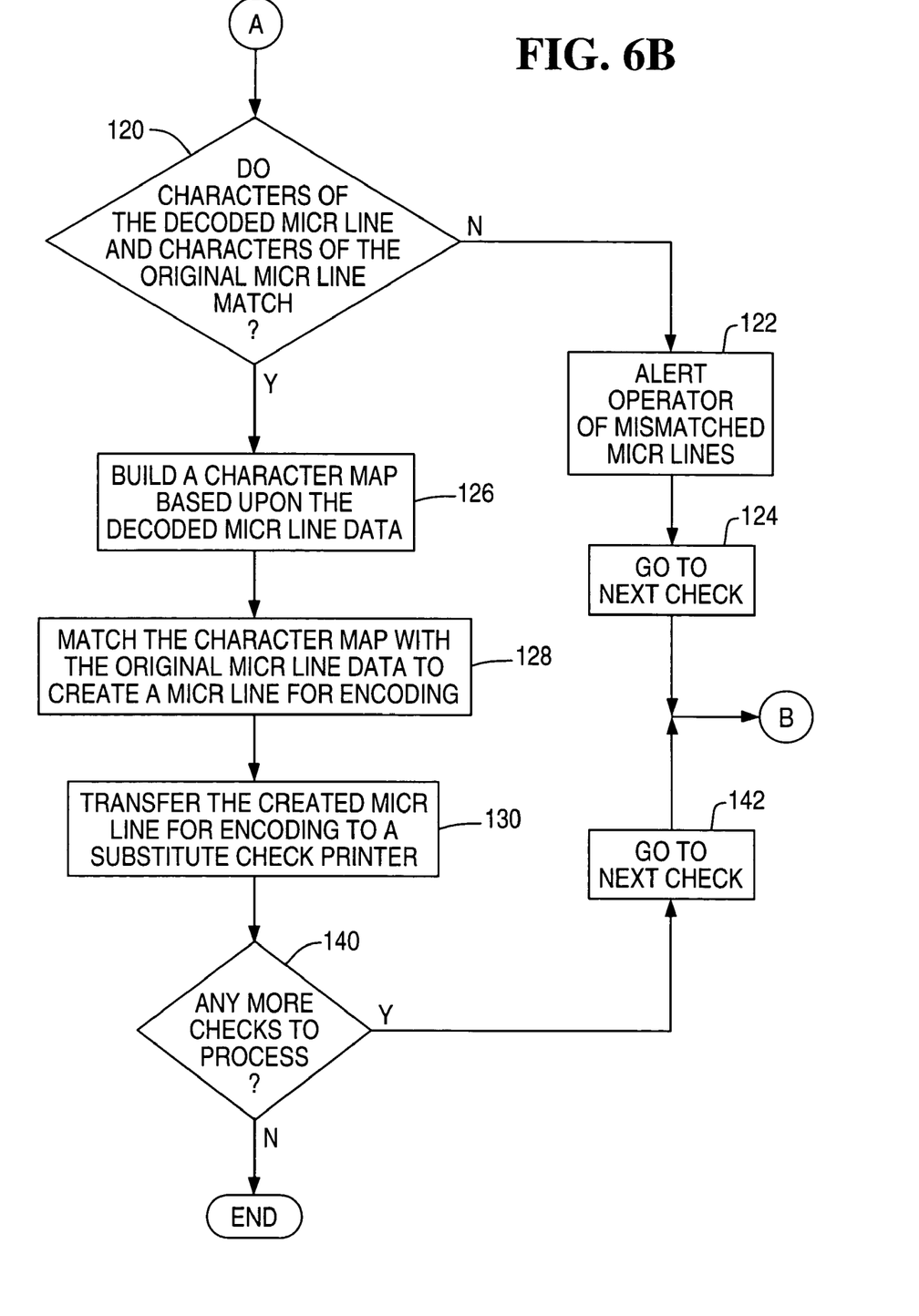

Referring to FIG. 6, a flowchart depicts the IRD creating application program 100 for creating an original IRD in accordance with the present invention. After program initialization in step 102, the check image data 91 (FIG. 5) which is representative of images of the check 10 and the original MICR line data 96 are received from clearing and exchange files, as shown in step 104. In step 106, a view of one of the check images represented by the check image data 91 is selected. Then, in step 110, a determination is made as to whether a MICR line is present in the check image selected in step 106.

If the determination in step 110 is negative, the program proceeds to step 111 in which a determination is made as to whether there is another image of the check 10 is available for viewing. If the determination in step 111 is negative, the program proceeds to step 113 in which an operator is alerted that no MICR line has been found in any of the check images viewed. If the determination in step 111 is affirmative, the program proceeds to step 112 to select another image of the check 10 for viewing. The program returns to step 110 to view this next check image to determine if a MICR line is present in this check image.

However, if the determination in step 110 is affirmative, the program proceeds to step 114 in which the MICR line found in the selected check image is decoded to provide the decoded MICR line data 93 which is stored in the data memory 94. As already described, the MICR line in the check image is decoded using the OCR reader 92. In step 116, the decoded MICR line data 93 is compared with the original MICR line data 96. Then, in step 120, a determination is made as to whether characters represented by the decoded MICR line data 93 and characters represented by the original MICR line data 96 match.

If the determination in step 120 is negative, the program proceeds to step 122 to alert an operator that the MICR line represented by the decoded MICR line data 93 and the MICR line represented by the original MICR line data do not match. The program proceeds to the next check, as shown in step 124, and then returns to step 104 to process this next check in the same manner as the previous check as just described hereinabove. However, if the determination in step 120 is affirmative, the program proceeds to step 126 to build a character map which is based upon the decoded MICR line data 93.

Then, in step 128, the character map created in step 126 is matched with the original MICR line data 96 to create a MICR line for encoding. The created MICR line for encoding includes all characters represented by the original MICR line data 96 and all spaces represented by the character map built in step 126. As shown in step 130, the MICR line for encoding created in step 128 is transferred to a substitute check printer (not shown) for allowing the substitute check printer to print the MICR line for encoding to create a substitute check.

A determination is made in step 140 as to whether there are any more checks to process. If the determination in step is negative, the program ends. If the determination in step 140 is affirmative, the process proceeds to the next check, as shown in step 142, and then returns to step 104 to program this next check in the same manner as the previous check as just described hereinabove.

It should be apparent that the original MICR line data 96 which is representative of an "un-formatted" MICR line (i.e., a MICR line which does not have the requisite spaces between the different MICR fields) is formatted as modified MICR line data 98 which is representative of a "formatted" MICR line (i.e., a MICR line which does have the requisite spaces between the different MICR fields). The modified MICR line data 98 which is representative of a "formatted" MICR line is sent to a substitute check printer to allow the substitute check printer to print the substitute check 50 shown in FIGS. 2 and 3. The result is that the MICR line 60 of the substitute check 50 shown in FIG. 2 appears the same as the MICR line 30 of the original check 10 shown in FIG. 1.

Although the above description describes re-creation of a MICR line associated with a personal-type of check, it is contemplated that re-creation of a MICR line may be associated with other types of checks. For example, a MICR line associated with a business-type of check may be re-created. In the case of a business-type of check, the MICR fields in the MICR line are usually located in different relative positions as compared to the relative positions of the MICR fields for a personal-type of check. The types of MICR fields for a business-type of check are also usually different from those of a personal-type of check.

Also, although the above description describes a character map being built in step 126 of the program 100, it is conceivable that this step not be required to provide the modified MICR line data 98 for sending to a substitute check printer. If this is the case, the decoded MICR line data 93 stored in the data memory 94 needs to be in a format which is suitable for further processing by the data processor 95. More specifically, the decoded MICR line data 93 needs to be in a format which can be matched with the original MICR line data 96, as described hereinabove with reference to step 126 shown in FIG. 6.

A number of advantages result by re-creating a MICR line for an IRD in accordance with the present invention. One advantage is that the encoded MICR line of a substitute check which has been created in certain check processing applications can be ensured to appear the same as the encoded MICR line of the original check from which the substitute check was created.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of creating a substitute check, the method comprising:
   receiving check image data which is representative of an image of an original check;
   receiving original magnetic ink character recognition (MICR) line data which is representative of MICR characters contained in a MICR line of the original check;
   decoding the check image data to provide decoded MICR line data;
   comparing the decoded MICR line data with the original MICR line data;
   creating modified MICR line data which is different from the original MICR line data based upon the comparison of the decoded MICR line data with the original MICR line data;
   sending the modified MICR line data to a substitute check printer; and
   printing a MICR line of a substitute check based upon the modified MICR line data.

2. A method according to claim 1, wherein decoding the check image data includes optically reading the MICR characters which are defined by the check image data.

3. A method according to claim 1, wherein comparing the decoded MICR line data with the original MICR line data includes determining if characters represented by the decoded MICR line data and characters represented by original MICR line data match.

4. A method of processing check image data which is representative of an image of an original check and original magnetic ink character recognition (MICR) line data which is representative of MICR characters contained in an original MICR line of the original check to provide data for use in re-creating a substitute check, the method comprising:
   decoding the check image data to provide decoded MICR line data which is representative of MICR character and spaces contained in the MICR line of the image of the check; and
   matching the decoded MICR line data and the original MICR line data to provide modified MICR line data which is representative of an encode MICR line for use in creating the substitute check.

5. A method according to claim 4, wherein the modified MICR line data includes data which is representative of spaces between characters.

6. A method according to claim 4, wherein decoding the check image data includes optically reading characters which are defined by the check image data.

7. A method of creating a substitute check for an original check which has an encode line printed thereon, the method comprising:
   receiving check image data which is representative of an image of the original check;
   analyzing the check image data to establish positioning of MICR characters within the encode line of the original check;
   formatting an encode line of the substitute check based upon the positioning of MICR characters within the encode line of the original check such that the formatted encode line of the substitute check matches the encode line of the original check; and
   printing the formatted encode line of the substitute check to create at least a portion of the substitute check.

8. An apparatus for processing check image data which is representative of an image of an original check and original magnetic ink character recognition (MICR) line data which is representative of MICR characters contained in an original MICR line of the original check to provide data for use in re-creating a substitute check, the apparatus comprising:
   means for decoding the check image data to provide decoded MICR line data which is representative of MICR character and spaces contained in the MICR line of the image of the check; and
   means for matching the decoded MICR line data and the original MICR line data to provide modified MICR line data which is representative of an encode MICR line for use in creating the substitute check.

9. An apparatus according to claim 8, wherein the modified MICR line data includes data which is representative of spaces between characters.

10. An apparatus according to claim 8, wherein the means for encoding the check image data includes means for optically reading characters which are defined by the check image data.

11. An apparatus for creating a substitute check for an original check which has an encode line printed thereon, the apparatus comprising:
   means for receiving check image data which is representative of an image of the original check;
   means for analyzing the check image data to establish positioning of MICR characters within the encode line of the original check;
   means for formatting an encode line of the substitute check based upon the positioning of MICR characters within the encode line of the original check such that the formatted encode line of the substitute check matches the encode line of the original check; and
   printing the formatted encode line of the substitute check to create at least a portion of the substitute check.

* * * * *